J. L. CARPENTER.
Stock-Feeding Device.
No. 209,225. Patented Oct. 22, 1878.
Fig: 1.
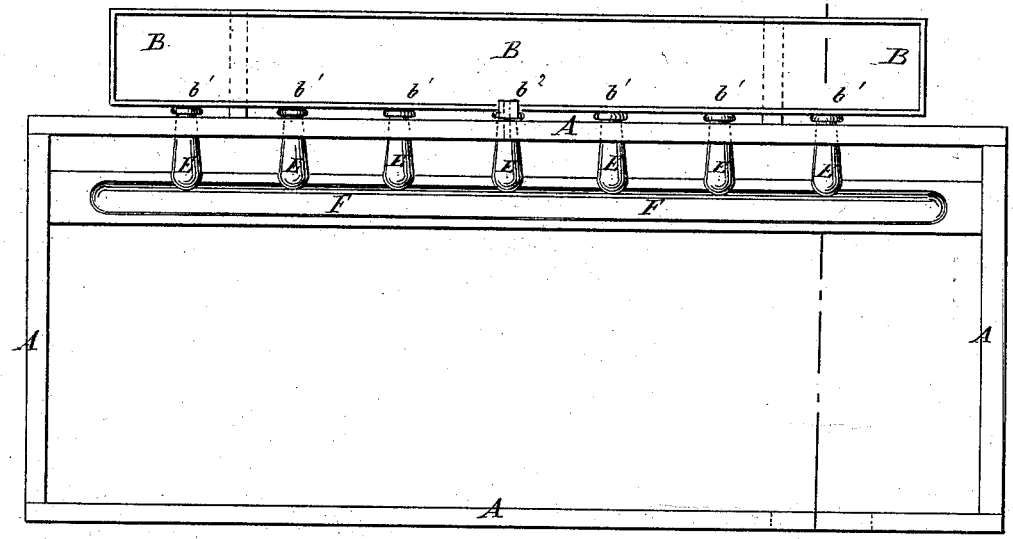
Fig: 2.
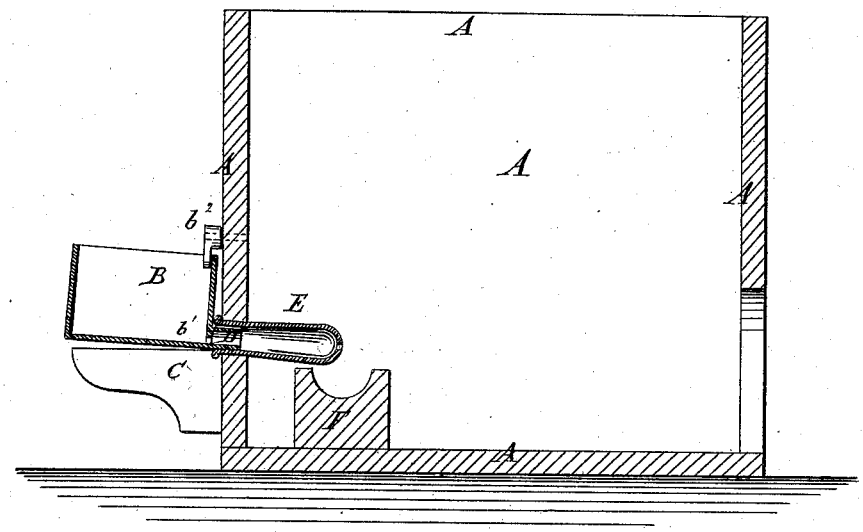
WITNESSES:
Chas. Nida
C. Sedgwick.
INVENTOR:
J. L. Carpenter
BY Munn & Co
ATTORNEYS.

UNITED STATES PATENT OFFICE.

JAMES L. CARPENTER, OF VINELAND, NEW JERSEY.

IMPROVEMENT IN STOCK-FEEDING DEVICES.

Specification forming part of Letters Patent No. 209,225, dated October 22, 1878; application filed June 5, 1878.

*To all whom it may concern:*

Be it known that I, JAMES L. CARPENTER, of Vineland, in the county of Cumberland and State of New Jersey, have invented a new and useful Improvement in Device for Feeding Young Pigs, &c., of which the following is a specification:

Figure 1 is a top view of my improved device shown as applied to a box or pen for containing the pigs. Fig. 2 is a vertical cross-section of the same, taken through the line *x x*, Fig. 1.

Similar letters of reference indicate corresponding parts.

The object of this invention is to furnish an improved device for feeding young pigs, lambs, goats, and calves that have been abandoned by their mothers, or which, from any cause, it is desirable to remove from their mothers, and which at the same time shall be simple in construction and convenient in use.

The invention consists in the combination, with a box or pen, of a receptacle for milk or other food, placed upon the outside of the pen, and provided with a series of nipples which project through the side of the pen to the interior thereof, together with a trough placed beneath the ends of the nipples to catch the drip and teach the pigs to drink, as hereinafter fully described.

A represents a box or pen, in which the young animals to be fed are kept. B is a box or trough, made of tin or other suitable material, placed at the side of the box or pen A, and supported by brackets C, or a shelf attached to the said box A, and upon which the said trough B is secured by buttons $b^2$, or other convenient means. The box or trough B may be further secured upon the brackets or shelf C by pins passed through the outer end of the said brackets at the outer side of the said trough. In the inner side of the trough B, at or close to its bottom, is formed a number of small holes, $b'$, and to the outer surface of the said side, around the said holes $b'$, are secured the inner ends of a number of short tubes, D, which are made of such a length as to pass into or through holes in the side of the box or pen A. Upon the outer ends of the tubes D are drawn rubber nipples E, which are kept from being drawn off the said tubes by necks formed upon the tubes, or by other suitable means. The nipples E are passed through the holes in the side of the box or pen A, and project to such a distance that the animal to be fed may readily reach them with his mouth.

F is a small trough placed beneath the ends of the nipples E, and which is designed to receive any drippings from the said nipples, or into which a small quantity of milk may be poured, so that the animals will learn to drink.

In using the device it may be necessary for a few times to insert the nipples E in the mouths of the pigs or other animals to be fed, after which the animals will readily find them for themselves.

When the animals are very young, warm milk should be given them. A little molasses and water should be mixed with the milk for the first few feedings. Afterward they may be fed with thin gruel, buttermilk, or other suitable liquid food, with more or less milk.

The use of this device will enable farmers to preserve young animals whose mothers refuse to own them, or from whose mothers it is desirable to remove them for any cause, and thus prevent loss from the death of said animals.

In defining my invention more clearly, I would say that I am aware that it is not new to employ a flexible nipple attached to a pipe dipping into a pail for the purpose of feeding young animals. I therefore disclaim this device, and confine my claim to the arrangement shown and described, which possesses the following distinctive advantages: First, the receptacle for the milk is on the outside of the pen or box, where it cannot be upset or soiled by the more greedy of the pigs; secondly, the liquid passes down into the nipples from hydrostatic pressure, and the pigs draw the milk from the start instead of receiving mouthfuls of air, as in the case disclaimed; thirdly, the trough F not only serves to catch the drip from the nipples, but, by holding a quantity of milk close to the mouths of the pigs, teaches them to drink.

Having thus described my invention, I claim as new and desire to secure by Letters Patent—

The combination, with the pen or box A, of the receptacle B for the milk, supported upon the outside of the box, and provided with a series of nipples, E, which project through the pen to the interior thereof, together with a trough, F, arranged beneath the ends of the nipples, substantially as and for the purpose set forth.

JAMES LATTY CARPENTER.

Witnesses:
C. F. SCOFIELD,
J. MASON.